F. N. THIEL.
LANTERN.
APPLICATION FILED APR. 18, 1910.
972,413.
Patented Oct. 11, 1910.
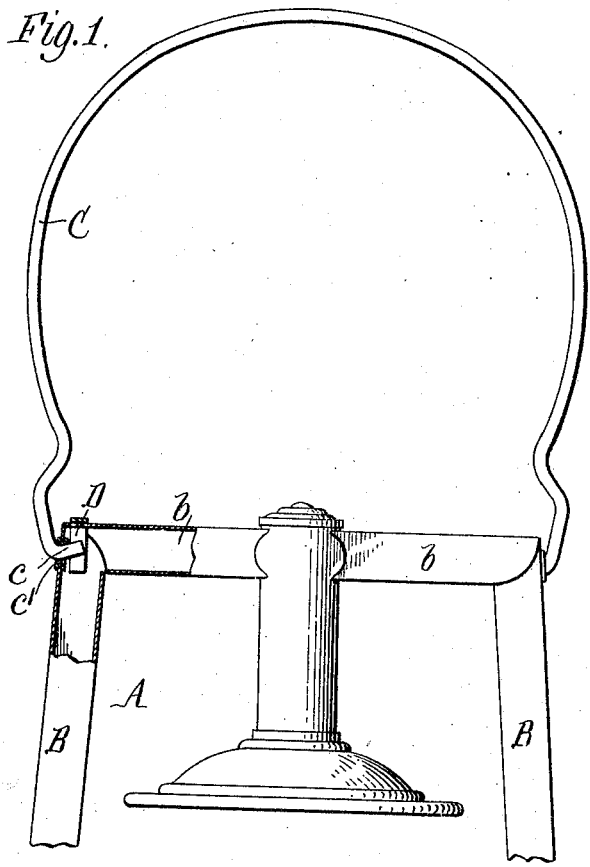
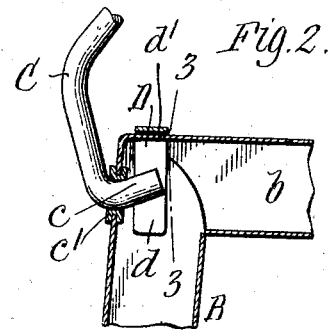
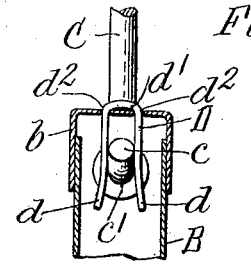
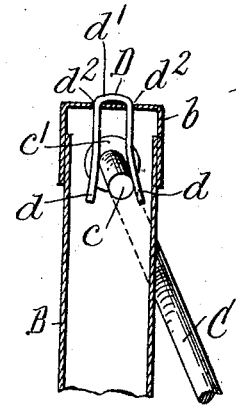
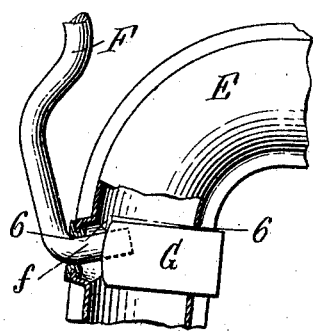
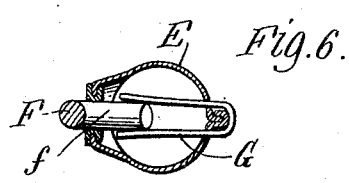
Witnesses:
E. A. Volk.
C. H. Bund.
Inventor:
Frank N. Thiel
by Wilhelm Parker & Hand
Attorneys.

UNITED STATES PATENT OFFICE.

FRANK N. THIEL, OF SYRACUSE, NEW YORK, ASSIGNOR TO R. E. DIETZ COMPANY, OF NEW YORK, N. Y.

LANTERN.

972,413.  Specification of Letters Patent.  Patented Oct. 11, 1910.

Application filed April 18, 1910. Serial No. 556,144.

*To all whom it may concern:*

Be it known that I, FRANK N. THIEL, a citizen of the United States, residing at Syracuse, in the county of Onondaga and State of New York, have invented a new and useful Improvement in Lanterns, of which the following is a specification.

This invention relates to improvements in bail holders which are provided on lanterns for holding the bail of the lantern yieldingly in an upright position.

The object of this invention is to provide a bail holder for this purpose of simple and inexpensive construction, which can be readily secured to the frame of the lantern and will yieldingly engage the bail for holding the same in both its upright and lowered positions, and which, when applied to tubular lanterns, will be concealed within the tube where it will be protected from injury in the handling of the lantern and will not detract from the appearance of the tube.

In the accompanying drawings: Figure 1 is a front elevation, partly in section, of the upper portion of a tubular lantern provided with a bail holder embodying the invention. Fig. 2 is a fragmentary sectional elevation, on an enlarged scale, of the bail holder and adjoining parts. Fig. 3 is a sectional elevation on line 3—3, Fig. 2. Fig. 4 is a similar view, showing the bail in its lowered position at the side of the lantern. Fig. 5 is a fragmentary front elevation, partly in section, of a lantern tube of different construction showing the bail holder applied thereto. Fig. 6 is a cross section thereof on line 6—6, Fig. 5.

Like reference characters refer to like parts in the several figures.

In Figs. 1–4, the bail holder is shown applied to a tubular lantern of common construction having air tubes which are rectangular in cross section. In these figures, A represents the top of the lantern, B the tubes having horizontal top portions $b$, and C the bail which is pivotally secured to the tubes by hooked ends $c$ which extend through suitable eyelet openings $c'$ in the outer sides of the tubes. All of these parts may be of any suitable construction.

D represents the bail holder which is of U-shape and comprises spaced flexible sides or arms $d\ d$ and a connecting portion $d'$. The holder is adapted to be secured to one of the tubes of the lantern adjacent to the bail in such a manner that its sides or arms will extend into the tube and straddle the end of the bail within the tube. This is preferably done, as shown, by providing the upper face of the top portions $b$ of the tube adjacent to its outer ends with suitable slots $d^2\ d^2$ through which the arms $d\ d$ are inserted into the tube, the connecting portion $d'$ resting on the upper face of the tube between the slots and soldered or otherwise secured thereto. This forms an easy and inexpensive means of securing the holder to the tube but any other suitable means may be employed for this purpose, if desired.

The flexible sides or arms $d\ d$ of the holder stand substantially parallel with the end $c$ of the bail on opposite sides thereof when the bail is in its upright position. The end portion $c$ of the bail is offset or bent to stand at an angle to the pivotal line, so that a turning movement of the bail will cause this end portion to move to one side, thereby bringing the offset end portion of the bail in forcible contact with an arm of the holder. This arm opposes further movement of the end in that direction and the holder thus tends to hold the bail upright and prevent it from dropping down on either side of the lantern, but the engaging side arms $d\ d$ are sufficiently flexible so that they will yield to allow the bail to be readily moved out of its upright position, when desired.

When the bail is in its lowered position at the side of the lantern, as shown in Fig. 4, it bears at one end against one of the side arms of the holder and is yieldingly held thereby from return movement. The bail is thus retained in its lowered position but can be readily moved therefrom when desired.

In Figs. 5 and 6, the bail holder is shown applied to a lantern tube of different construction which is substantially round or oval in cross section and is curved at its upper end to form the top portion thereof. In these figures E represents the tube, F the bail, $f$ the hooked end thereof and G the bail holder. The bail holder is inserted into the tube from the inner side thereof opposite to the end of the bail and is secured therein with its ends in engagement with the opposite sides of the end of the bail. The sides of the bail holder are made somewhat wider than in the construction first described so that they will remain in engagement with the end of the bail throughout the entire turning movement thereof. They stand upright on each side of the end of the bail and tend to yieldingly oppose any turning of the bail from its upright position, and when the bail is in its lowered position on either side of the lantern, they will yieldingly resist any return movement thereof.

While the bail holder has been shown and described as applied to tubular lanterns, its use is not limited to these and it may be employed upon lanterns of various other types and styles, and instead of providing one holder, as shown, two holders, one for each end of the bail, may be employed, if desired. The holder is rigidly secured to the frame and has yielding engagement with the bail. It is simple and inexpensive in construction and can be readily applied to lanterns of standard types without requiring any material change in the construction of the frame and bail.

When used on tubular lanterns, the holder is concealed within the lantern tube and has no projecting parts which are liable to become broken in shipping and handling the lantern, nor does its presence on the lantern in any way change or alter the appearance thereof.

I claim as my invention:

1. The combination with a lantern frame and a bail pivoted thereto, of a bail holder which is rigidly secured to said frame and which comprises flexible arms which straddle a portion of the bail extending beyond the pivot thereof and operating to deflect one of said arms upon moving the bail out of its position of rest, such deflected arm yielding to the movement of the bail from one position of rest to another upon applying sufficient force, substantially as set forth.

2. The combination with a lantern frame and a bail pivoted thereto and provided with a portion offset from the pivot thereof, of a bail holder which is rigidly secured to said frame and which comprises flexible members between which said offset portion engages, whereby said bail is yieldingly held in its raised position but permitted to be turned out of such position, by which movement one of said members is deflected or strained, substantially as set forth.

3. The combination with a lantern tube and a bail, of a bail holder which is secured to the tube and yieldingly engages a part on the bail within the tube for holding the bail in its upright position, substantially as set forth.

4. The combination with a lantern tube and a bail having an end which projects into the tube, of a bail holder which is secured to said tube and yieldingly engages the projecting end of said bail within said tube for holding the bail in its upright position, substantially as set forth.

5. The combination with a lantern tube and a bail having an end which projects into the tube, of a bail holder which is secured to said tube and has spaced arms which extend within said tube and yieldingly engage the opposite sides of the projecting end of the bail for holding the bail in both its upright and lowered positions, substantially as set forth.

Witness my hand in the presence of two subscribing witnesses.

FRANK N. THIEL.

Witnesses:
P. L. SALMON,
MOSE F. WHELAN.